(12) United States Patent
Mitsutake (10) Patent No.: US 10,009,500 B2
(45) Date of Patent: Jun. 26, 2018

(54) LIGHT-GUIDE MEMBER, ILLUMINATION DEVICE, AND IMAGE READING APPARATUS USING A LINE-SEQUENTAL METHOD TO ILLUMINATE A DOCUMENT FOR READING

(71) Applicant: CANON KABUSHIKI KAISHA, Tokyo (JP)

(72) Inventor: Ikutaro Mitsutake, Haga-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/372,240

(22) Filed: Dec. 7, 2016

(65) Prior Publication Data

US 2017/0187907 A1    Jun. 29, 2017

(30) Foreign Application Priority Data

Dec. 24, 2015  (JP) ................. 2015-251329

(51) Int. Cl.
| | |
|---|---|
| H04N 1/028 | (2006.01) |
| H04N 1/10 | (2006.01) |
| F21V 5/08 | (2006.01) |
| H04N 1/193 | (2006.01) |
| G02B 17/06 | (2006.01) |

(Continued)

(52) U.S. Cl.
CPC ............ *H04N 1/0284* (2013.01); *F21V 5/02* (2013.01); *F21V 5/08* (2013.01); *G02B 17/086* (2013.01); *G02B 17/0868* (2013.01); *H04N 1/02825* (2013.01); *H04N 1/02895* (2013.01); *H04N 1/1061* (2013.01); *H04N 1/1937* (2013.01); *H04N 2201/0081* (2013.01); *H04N 2201/0458* (2013.01)

(58) Field of Classification Search
None
See application file for complete search history.

(56) References Cited

U.S. PATENT DOCUMENTS

| | | | |
|---|---|---|---|
| 2010/0177362 A1* | 7/2010 | Kim ................. | H04N 1/02815 358/474 |
| 2013/0194642 A1* | 8/2013 | Kawasaki ........... | G02B 5/0215 358/484 |
| 2015/0316706 A1* | 11/2015 | Fujiuchi ............ | H04N 1/02835 358/482 |

FOREIGN PATENT DOCUMENTS

| | | |
|---|---|---|
| JP | 2008-032759 A | 2/2008 |
| JP | 2008-216409 A | 9/2008 |

(Continued)

*Primary Examiner* — Thomas D Lee
(74) *Attorney, Agent, or Firm* — Canon U.S.A., Inc. IP Division (57) ABSTRACT

A light-guide member includes a light-incident surface formed at an end portion of the light-guide member in a first direction, a light-emitting surface that is elongated in the first direction and that includes first and second light-emitting regions, which cause light to be emitted in different directions in a first cross section that is perpendicular to the first direction, a common deflecting portion that deflects light from the light-incident surface and causes the light to be emitted from the first and second light-emitting regions to the outside, and first and second protruding portions each of which is located on one of two sides of the deflecting portion in the first cross section, the first and second protruding portions protruding in a direction away from the light-emitting surface with respect to the deflecting portion.

13 Claims, 5 Drawing Sheets

(51) Int. Cl.
    *F21V 5/02*     (2006.01)
    *G02B 17/08*    (2006.01)

(56) References Cited

FOREIGN PATENT DOCUMENTS

JP     2009-225414 A    10/2009
JP     2011-044336 A     3/2011

* cited by examiner

LIGHT-GUIDE MEMBER, ILLUMINATION DEVICE, AND IMAGE READING APPARATUS USING A LINE-SEQUENTAL METHOD TO ILLUMINATE A DOCUMENT FOR READING

BACKGROUND OF THE INVENTION

Field of the Invention

Embodiments of the present invention relate to a light-guide member, an illumination device, and an image reading apparatus, and more particularly to an image reading apparatus, such as an image scanner, a copying machine, or a facsimile machine, that performs image reading by illuminating a surface of a document by a line-sequential method.

Description of the Related Art

An image reading apparatus that obtains information regarding an image of a document includes an illumination device that illuminates a to-be-read region of a document. A known example of an illumination device is an illumination device that includes a light-guide member that guides light emitted by a light source to a surface to be illuminated.

There is known an illumination device that includes a reflective plate, which is disposed at a position facing a light-guide member with a reading optical axis interposed therebetween, and that illuminates a region to be illuminated from two directions by using only one light-guide member, the two directions being symmetrical about the reading optical axis. More specifically, Japanese Patent Laid-Open No. 2011-044336 discloses a light-guide member that is included in an illumination device, which illuminates a region to be illuminated from two directions, the two directions being symmetrical about the reading optical axis, and that has a deflecting portion that deflects light to a position facing a light-emitting surface.

However, in the above-described related art, deflecting portions are provided so as to correspond to first and second light-emitting regions, respectively, and high processing precision is required for each of the deflecting portions in order to realize a highly efficient light-guide member. Thus, there has been a problem in that the configuration of metal molds used for molding the light-guide member becomes complex.

SUMMARY OF THE INVENTION

Embodiments of the present invention are directed at providing a highly efficient light-guide member having a simple configuration, an illumination device, and an image reading apparatus.

A light-guide member according to an aspect of the present invention includes a light-incident surface formed at an end portion of the light-guide member in a first direction, a light-emitting surface that is elongated in the first direction and that includes first and second light-emitting regions, which cause light to be emitted in different directions in a first cross section that is perpendicular to the first direction, a common deflecting portion that deflects light from the light-incident surface and causes the light to be emitted from the first and second light-emitting regions to the outside, and first and second protruding portions each of which is located on one of two sides of the deflecting portion in the first cross section, the first and second protruding portions protruding in a direction away from the light-emitting surface with respect to the deflecting portion.

Further features of the present invention will become apparent from the following description of exemplary embodiments with reference to the attached drawings.

BRIEF DESCRIPTION OF THE DRAWINGS

FIGS. 4A and 4B are diagrams each illustrating the relationship between a region of a diffuse-reflecting member on which light rays are incident and reflected light rays.

DESCRIPTION OF THE EMBODIMENTS

An embodiment of the present invention will be described in detail below with reference to the accompanying drawings.

Embodiment (Image Reading Apparatus)

Figure 1:
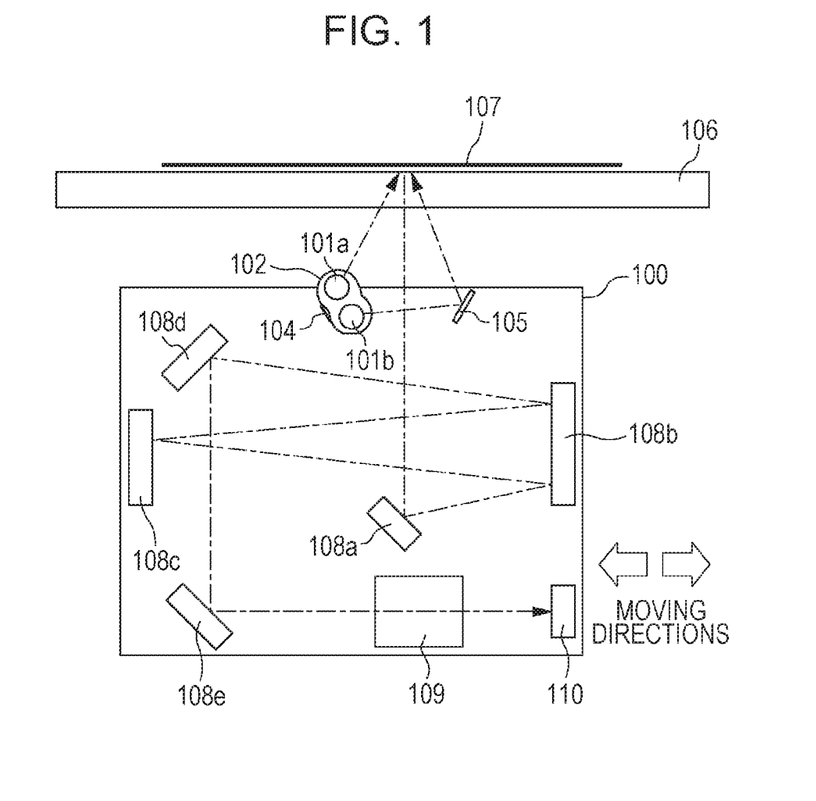
FIG. 1 is a diagram illustrating an image reading apparatus provided with an illumination device that includes a light-guide member according to an embodiment of the present invention.

FIG. 1 is a schematic diagram illustrating a principal portion of an image reading apparatus provided with an illumination device that includes a light-guide member according to an embodiment of the present invention. The image reading apparatus illustrated in FIG. 1 includes a carriage 100 in which various optical components for reading an image are accommodated and a document table glass 106 on which a document 107, which is to be read, is to be placed. The image reading apparatus performs reading of a two-dimensional image of the document 107 by reading a region to be read (surface to be illuminated), which is elongated in the vertical direction as viewed in FIG. 1 (first direction), while moving in moving directions illustrated in FIG. 1. The region to be read will hereinafter be referred to as target region.

The optical configuration of the image reading apparatus provided with the illumination device that includes the light-guide member according to the present embodiment will now be described with reference to FIG. 1. FIG. 1 illustrates a white light emitting diode (hereinafter referred to as an LED) 101a serving as a first light source and an LED 101b serving as a second light source, and light rays incident on a diffuse-reflecting portion (reflecting portion) 104 through a light-incident surface 201 are diffusely reflected by the diffuse-reflecting portion 104 and emitted from a light-guide member 102. Some of the light rays, which have been emitted from the light-guide member 102, pass through the document table glass 106 and travel toward the document 107, and the rest of the light rays are reflected by an opposing reflective plate 105 and then travel toward the document 107 like the other light rays. As a result, the document 107 is illuminated from two directions, the two directions being symmetrical about a reading optical axis.

Regarding the document 107, which has been illuminated, an imaging lens 109, which is an imaging unit, and a line sensor 110, which is a light-receiving unit, cause the light rays to illuminate, in a line-sequential manner, the target region, which is elongated in the vertical direction as viewed in FIG. 1 (the target region is read in a line-sequential manner). Here, the reflecting mirrors 108a to 108e change the direction of the optical path, and the reflecting mirrors 108a to 108e are accommodated in the carriage 100. The information regarding an image of the document 107, which has been read, is sent to a personal computer, a printer, or the like via an interface (not illustrated) so as to be processed as a data item or be output to a monitor or printed onto a sheet.

(Illumination Device, Light-Guide Member, and Diffuse-Reflecting Member)

Figure 2A:
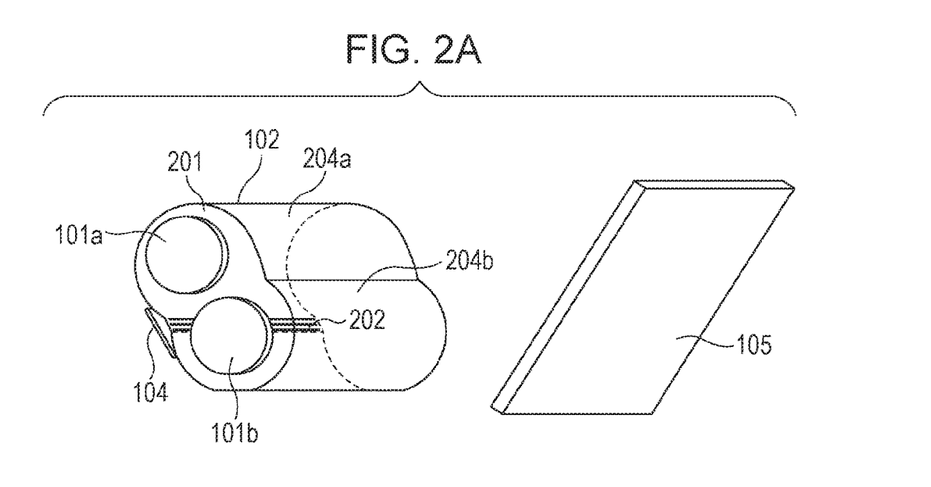
FIG. 2A is a perspective view illustrating the illumination device, which includes the light-guide member according to the embodiment of the present invention.

The illumination device that includes the light-guide member according to the present embodiment and the light sources will now be described with reference to FIGS. 2A and 2B. In FIG. 2A, light rays (light) emitted by the LEDs 101a and 101b are incident on first and second light-incident regions of the light-incident surface 201 that corresponds to an end portion (end surface) of the light-guide member 102, which is made of a transparent acrylic resin, in the longitudinal direction of the light-guide member 102, (the first direction and a main scanning direction). Then, the light rays propagate in the longitudinal direction and are fully reflected by a side surface of the light-guide member 102.

Some of the light rays, which propagate, are incident on a prism portion 202 that has a surface having an uneven structure, which is formed of a large number of protruding portions and recess portions, and that is formed integrally with the light-guide member 102, and some of the light rays incident on the prism portion 202 leak from the prism portion 202 toward the outside of the light-guide member 102 and are incident on the diffuse-reflecting portion 104.

The diffuse-reflecting portion 104 is formed of a member that is white and that has high reflectivity and has a function of reflecting the light rays incident thereon back to the light-guide member 102, and accordingly, the light rays reflected by the diffuse-reflecting portion 104 are incident on the light-guide member 102 again. Then, the light rays excluding a component that is internally reflected by first and second light-emitting regions 204a and 204b of a light-emitting surface 204, which is a side surface of the light-guide member 102, are emitted to the outside of the light-guide member 102.

Figure 2B:
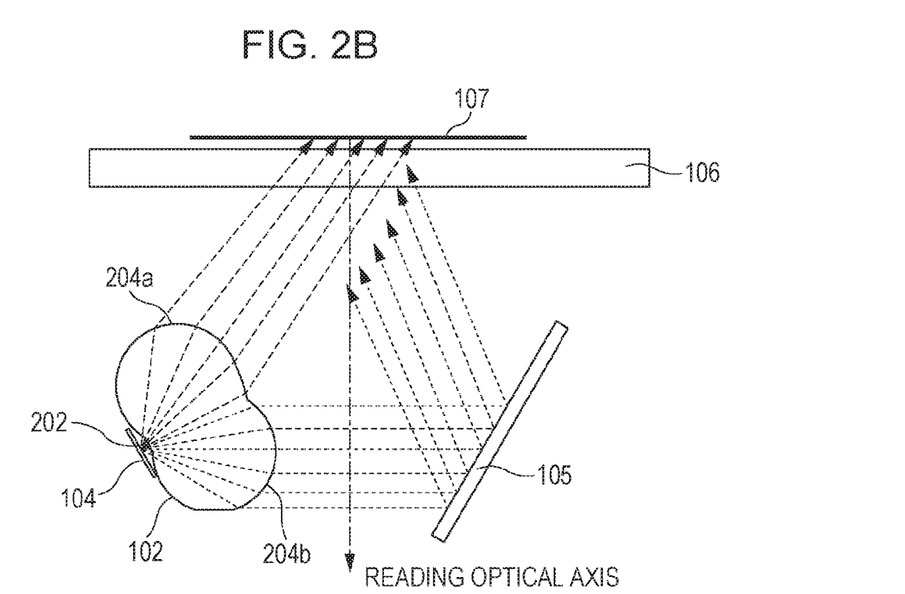
FIG. 2B is a sub-scanning cross sectional view of FIG. 2A.

In FIG. 2B, which illustrates a sub-scanning cross section, which is a cross section perpendicular to the main scanning direction, the first and second light-emitting regions 204a and 204b of the light-emitting surface 204 each have a curved surface shape and form two discontiguous arc shapes. The first and second light-emitting regions 204a and 204b divide, at a discontiguous portion thereof, light rays in such a manner that light rays that have passed through the first light-emitting region 204a travel directly toward a surface of the document 107, and that light rays that have passed through the second light-emitting region 204b are reflected by the opposing reflective plate 105 so as to travel toward the surface of the document 107. In other words, protruding portions forming the first and second light-emitting regions 204a and 204b and a recess portion located between the protruding portions form a discontiguous shape.

In addition, in FIG. 2B, the first and second light-emitting regions 204a and 204b of the light-emitting surface 204 each have a function like a lens. Accordingly, light rays that pass through the light-guide member 102 while being diffused by the diffuse-reflecting portion 104 are focused so as to be a substantially collimated light beam and are propagated toward the surface of the document 107 or the opposing reflective plate 105.

(Prism Portion)

Figure 3A:
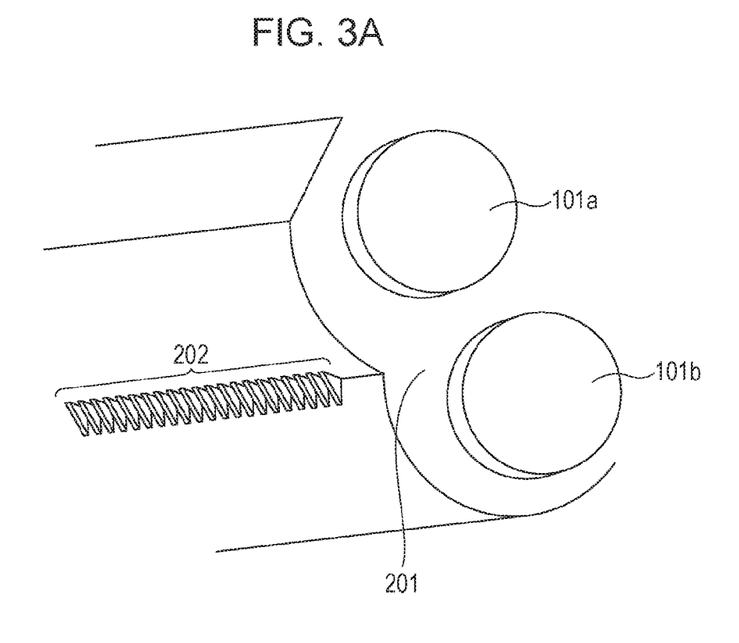
FIG. 3A is a perspective view illustrating the light-guide member according to the embodiment of the present invention.
Figure 3B:
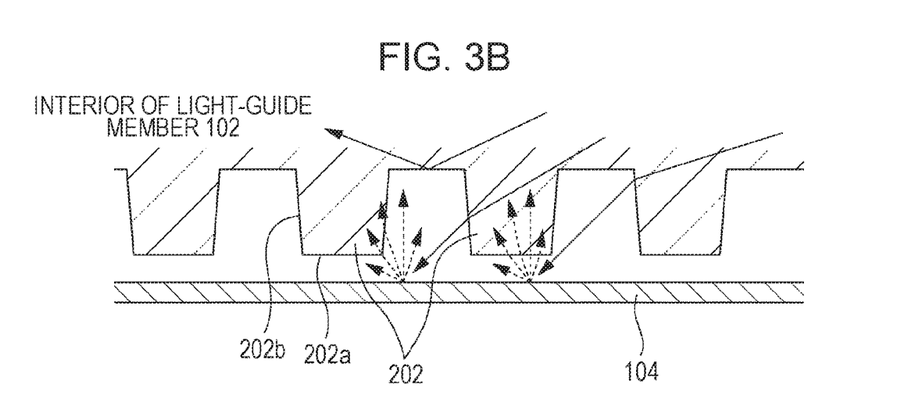
FIG. 3B is a main-scanning cross sectional view of FIG. 3A.

FIGS. 3A and 3B are diagrams illustrating the shape of the peripheral portion of the prism portion 202 having a deflecting portion and the states of light rays. In FIG. 3A, the prism portion (a plurality of prisms) 202 is disposed at a recessed position (i.e., a recess portion) located between portions (protruding portions) of a side surface of the light-guide member 102, the portions protruding outward (toward the side opposite to the light-emitting surface 204). In a cutting plane (main-scanning cross section) parallel to the longitudinal direction of the light-guide member 102, the plurality of prisms, which are the protruding portions, which form part of the uneven structure and which are periodically and discretely arranged in the main scanning direction, each have a substantially rectangular shape as illustrated in FIG. 3B.

As illustrated in FIGS. 3A and 3B, in the present embodiment, the prism portion 202 is provided so as to be common to the first and second light-emitting regions 204a and 204b (the first and second light-emitting regions 204a and 204b are not separately provided with the prism portion 202). Prism surfaces 202a and 202b of the prism portion 202 function as deflecting portions that deflect some of light rays, which have been incident through the light-incident surface 201, in such a manner that the light rays are emitted to the outside of the light-guide member 102 and that cause the direction of light rays, which have been reflected by the diffuse-reflecting portion 104 so as to travel back into the light-guide member 102, to be oriented toward the light-emitting surface 204.

In the present embodiment, as illustrated in FIG. 3A, the prism portion 202 is disposed at a location more recessed than the protruding portions of the side surface of the light-guide member 102, and thus, the diffuse-reflecting portion 104 can be brought close to the side surface of the light-guide member 102. As a result, light rays that have been diffusely reflected by the diffuse-reflecting portion 104 can be effectively caused to travel back to the light-guide member 102.

In addition, in the sub-scanning cross section, since light rays emitted by the light-guide member 102 are incident on a relatively small region of the diffuse-reflecting portion 104, light rays that have been diffusely reflected can effectively illuminate the target region. The relationship between the distribution of light rays at the diffuse-reflecting portion 104 and light rays that travel toward the surface of the document 107 will be schematically described below with reference to FIGS. 4A and 4B, each of which illustrates a sub-scanning cross section.

Figure 4A:
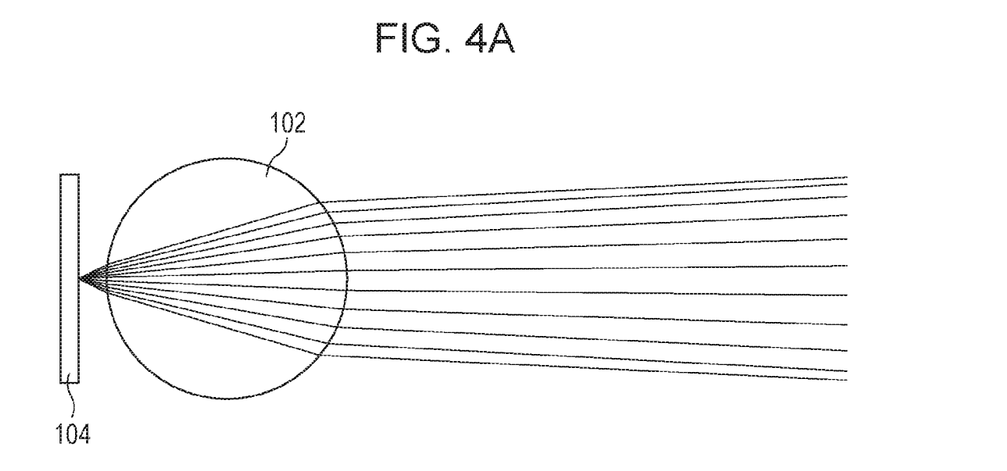
FIG. 4A is a diagram illustrating the case where the region of the diffuse-reflecting member on which light rays are incident is small.
Figure 4B:
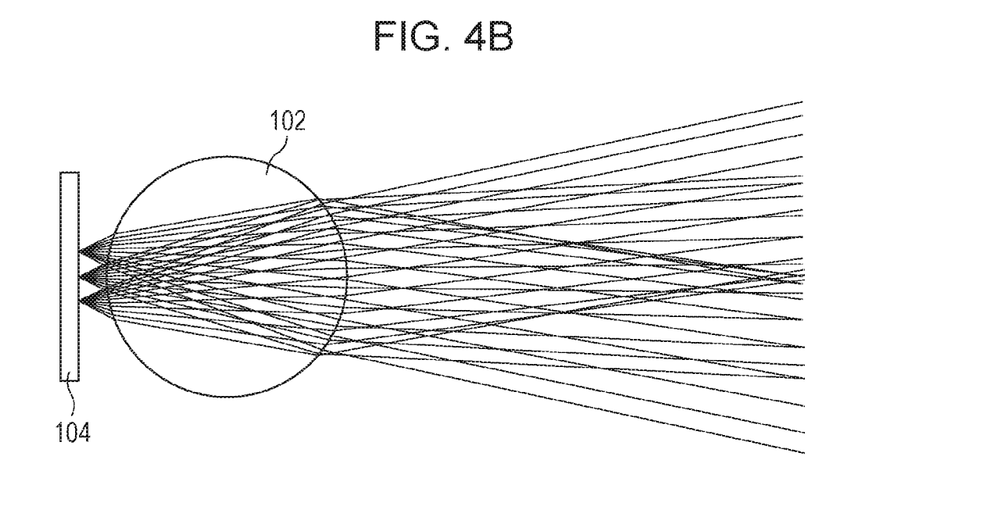
FIG. 4B is a diagram illustrating the case where the region of the diffuse-reflecting member on which light rays are incident is large.

FIG. 4A illustrates the case where a region of the diffuse-reflecting member 104 on which light rays are incident is small. In this case, as the region of the diffuse-reflecting member 104 on which the light rays are incident becomes closer to a point in a cross section of FIG. 4A, light rays that have passed through the light-guide member 102 can easily be intentionally controlled so as to be close to a parallel light beam flux or so as to be brought into a desired focused state. In contrast, FIG. 4B illustrates the case where the region of the diffuse-reflecting member 104 on which light rays are incident is large. In this case, it is difficult to bring light rays including light rays that have been diffusely reflected in a wide area into a desired focused state, and there is an increase in the proportion of light rays that will not travel toward the target region and therefore remain unused.

(How to Light Rays Travel in the Vicinity of Prism Portion 202)

Figure 5A:
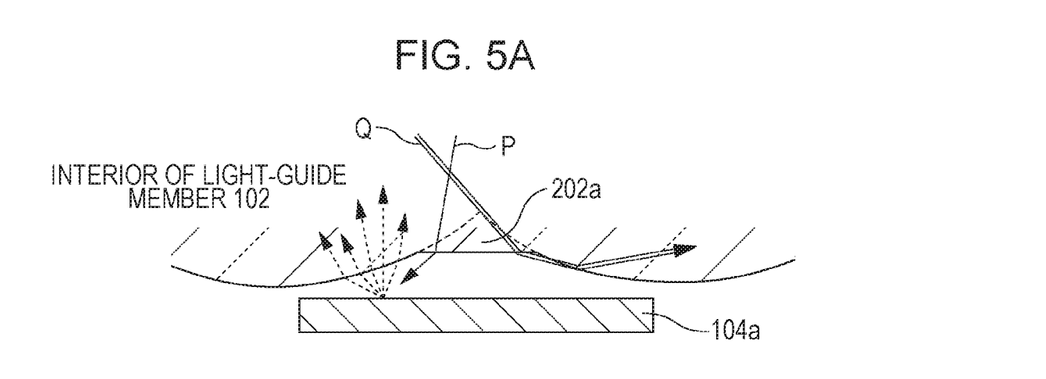
FIG. 5A is a diagram illustrating a prism portion of the light-guide member according to the embodiment of the present invention and the diffuse-reflecting member located outside the light-guide member.
Figure 5B:
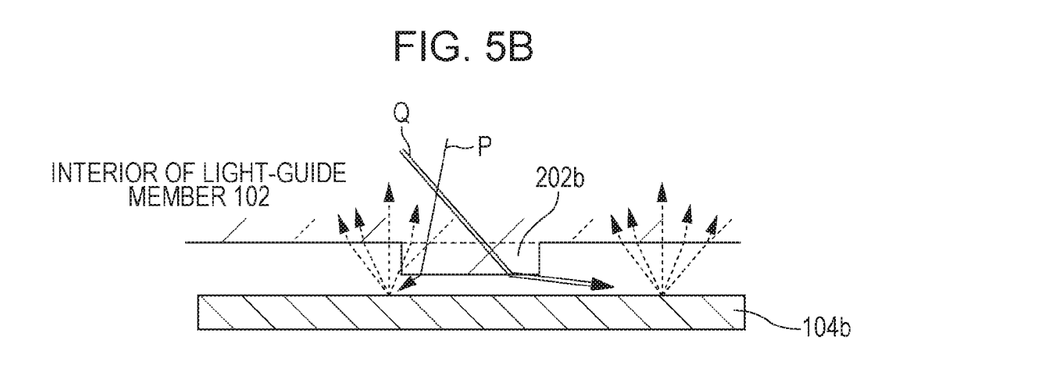
FIG. 5B is a diagram illustrating Comparative Example 1.
Figure 5C:
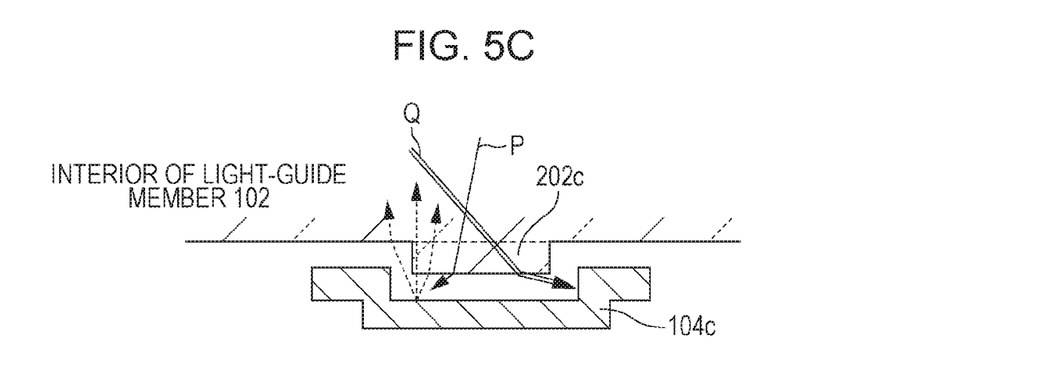
FIG. 5C is a diagram illustrating Comparative Example 2.

FIGS. 5A to 5C are diagrams each illustrating how light rays travel in the vicinity of the prism portion 202 in the cross section (the sub-scanning cross section) perpendicular to the longitudinal direction of the light-guide member 102. FIG. 5A illustrates the shape of the present embodiment, and light rays that are incident on the prism portion 202a at an angle larger than a critical angle are emitted outside the light-guide member 102 and travel toward a diffuse-reflecting member 104a (104) as indicated by arrow P. In the case where the angle of incidence of the light rays is close to the critical angle and where the light rays are emitted along the surface of the light-guide member 102 as indicated by arrow Q, the light rays are incident on one of the protruding portions of the side surface of the light-guide member 102 and propagate within the light-guide member 102 again.

In contrast to the present embodiment, in the case where the prism portion 202b protrudes with respect to the side surface of the light-guide member 102 as illustrated in FIG. 5B, which illustrates Comparative Example 1, the distance between the side surface of the light-guide member 102 and a diffuse-reflecting portion 104b is likely to increase, and the light rays are incident on a large region of the diffuse-reflecting portion 104b. In this case, as a result, the amount of illumination light and the optical efficiency will be reduced. As illustrated in FIG. 5B, even if a configuration is employed in which the diffuse-reflecting portion 104b is formed so as to be larger than the diffuse-reflecting member 104a in order to reflect light rays emitted from the prism portion 202b as much as possible, the light rays spread in a large region of the diffuse-reflecting member 104b, and consequently, the amount of the light rays travelling toward the surface of the document 107 will ultimately be reduced.

As Comparative Example 2, a configuration can be considered, in which a diffuse-reflecting portion 104c is formed so as to follow the shape of the side surface of the light-guide member 102 as illustrated in FIG. 5C. In this case, the light rays emitted from a prism portion 202c can be received in a relatively small region and can be diffusely reflected. However, the shape of the diffuse-reflecting portion 104c becomes complex, which in turn leads to an increase in the manufacturing costs. In addition, there is a possibility that the prism portion 202c will be deformed as a result of being brought into contact with the diffuse-reflecting portion 104c or the like due to vibration generated at the time of assembling or during use.

As in the above-described embodiment, in the case of a light-guide member that includes a large number of prism portions and that causes light rays to travel toward a diffuse-reflecting member so as to form an illumination light rays, it can be said that a configuration in which the prism portions are positioned at locations more recessed than a side surface of the light-guide member is advantageous in terms of optical efficiency and also quality stability.

(Modifications)

Although the embodiment of the present invention has been described above, the present invention is not limited to the above embodiment, and various modifications and changes may be made within the gist of the present invention.

(Modification 1)

Although, in the above-described embodiment, the light-incident surface includes the first and second light-incident regions on which light rays emitted by the first and second light sources are incident, the light-incident surface may include a light-incident region on which light rays emitted by a single light source is incident.

(Modification 2)

Although, in the above-described embodiment, the first and second light-emitting regions have different curved surface shapes in the sub-scanning cross section, the first and second light-emitting regions may have the same curved surface shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-251329, filed Dec. 24, 2015, which is hereby incorporated by reference herein in its entirety.

What is claimed is:

1. A light-guide member comprising:
    a light-incident surface formed at an end portion of the light-guide member in a first direction;
    a light-emitting surface that is elongated in the first direction and that includes first and second light-emitting regions, which cause light to be emitted in different directions in a first cross section perpendicular to the first direction;
    a common deflecting portion that deflects light from the light-incident surface toward the first and second light-emitting regions; and
    a first protruding portion located on one side of the deflecting portion in the first cross section, and
    a second protruding portion located on other side of the deflecting portion in the first cross section,
    wherein the first and second protruding portions are protruded in a direction away from the light-emitting surface with respect to the deflecting portion, and
    wherein curvature of the first and second light-emitting regions are different from each other in the first cross section.

2. The light-guide member according to claim 1, wherein the deflecting portion is provided between the first and second protruding portions in the first cross section.

3. The light-guide member according to claim 1, wherein the deflecting portion includes a plurality of prisms arranged in the first direction.

4. The light-guide member according to claim 3, wherein the plurality of prisms are periodically and discretely arranged.

5. The light-guide member according to claim 3, further comprising:
    a reflecting portion that reflects light, which have passed through the plurality of prisms, toward the deflecting portion.

6. The light-guide member according to claim 1, wherein each of the first and second protruding portions has a curved surface shape in the first cross section.

7. The light-guide member according to claim 1, wherein the light-incident surface includes first and second light-incident regions on which light emitted from first and second light sources are incident.

8. The light-guide member according to claim 1, wherein a recess portion is formed between the first and second protruding portions in the first cross section.

9. The light-guide member according to claim 8, wherein the first and second protruding portions and the recess portion are discontiguous in the first cross section.

10. The light-guide member according to claim 1, further comprising:
a reflecting portion that reflects light, which have passed through the deflecting portion, toward the deflecting portion.

11. An illumination device comprising:
a light source; and
a light-guide member that guides light rays emitted by the light source to a surface to be illuminated,
wherein the light-guide member includes
a light-incident surface formed at an end portion of the light-guide member in a first direction,
a light-emitting surface that is elongated in the first direction and that includes first and second light-emitting regions, which cause light to be emitted in different directions in a first cross section is perpendicular to the first direction,
a common deflecting portion that deflects light from the light-incident surface toward the first and second light-emitting regions; and
a first protruding portion located on one side of the deflecting portion in the first cross section, and
a second protruding portion located on other side of the deflecting portion in the first cross section,
wherein the first and second protruding portions are protruded in a direction away from the light-emitting surface with respect to the deflecting portion, and
wherein curvature of the first and second light-emitting regions are different from each other in the first cross section.

12. The illumination device according to claim 11, further comprising:
a reflecting portion that reflects light rays, which have passed through the deflecting portion, toward the light-guide member.

13. An image reading apparatus comprising:
a light source;
a light-guide member that guides light rays emitted by the light source to a surface to be illuminated;
a light-receiving unit that receives light rays from the surface to be illuminated; and
an imaging unit that guides the light rays from the surface to be illuminated to the light-receiving unit,
wherein the light-guide member includes
a light-incident surface formed at an end portion of the light-guide member in a first direction,
a light-emitting surface that is elongated in the first direction and that includes first and second light-emitting regions, which cause light to be emitted in different directions in a first cross section perpendicular to the first direction;
a common deflecting portion that deflects light from the light-incident surface toward the first and second light-emitting regions; and
a first protruding portion located on one side of the deflecting portion in the first cross section, and
a second protruding portion located on other side of the deflecting portion in the first cross section,
wherein the first and second protruding portions are protruded in a direction away from the light-emitting surface with respect to the deflecting portion, and
wherein curvature of the first and second light-emitting regions are different from each other in the first cross section.

* * * * *